US012447267B2

(12) United States Patent
Yang (10) Patent No.: US 12,447,267 B2
(45) Date of Patent: Oct. 21, 2025

(54) UNILATERALLY DRIVEN CLOSED-LOOP ARTIFICIAL PANCREAS AND DATA OBTAINING METHOD FOR PROGRAM MODULE THEREOF

(71) Applicant: MEDTRUM TECHNOLOGIES INC., Shanghai (CN)

(72) Inventor: Cuijun Yang, Shanghai (CN)

(73) Assignee: MEDTRUM TECHNOLOGIES INC., Shanghai (CN)

( * ) Notice: Subject to any disclaimer, the term of this patent is extended or adjusted under 35 U.S.C. 154(b) by 779 days.

(21) Appl. No.: 17/787,593

(22) PCT Filed: Aug. 26, 2020

(86) PCT No.: PCT/CN2020/111171
§ 371 (c)(1),
(2) Date: Jun. 21, 2022

(87) PCT Pub. No.: WO2021/135291
PCT Pub. Date: Jul. 8, 2021

(65) Prior Publication Data
US 2022/0409106 A1    Dec. 29, 2022

(30) Foreign Application Priority Data
Dec. 31, 2019   (WO) ................ PCT/CN2019/130445

(51) Int. Cl.
*A61M 5/142*     (2006.01)
*A61B 5/145*     (2006.01)
(Continued)

(52) U.S. Cl.
CPC ..... *A61M 5/14236* (2013.01); *A61B 5/14532* (2013.01); *A61M 5/14216* (2013.01);
(Continued)

(58) Field of Classification Search
None
See application file for complete search history.

(56) References Cited

U.S. PATENT DOCUMENTS 8,343,092 B2 *   1/2013  Rush .................... A61B 5/0002
                                                    604/503
9,247,878 B2 *   2/2016  Valdes ............. A61B 5/150969
(Continued)

FOREIGN PATENT DOCUMENTS

CN         103260678       8/2013
CN         103463695       12/2013
(Continued)

OTHER PUBLICATIONS

"Search Report of Europe Counterpart Application", issued on May 6, 2024, p. 1-p. 12.
(Continued)

*Primary Examiner* — Manuel A Mendez
(74) *Attorney, Agent, or Firm* — JCIPRNET (57) ABSTRACT

A unilaterally driven closed-loop artificial pancreas, includes: a detection module, an infusion module and a program module. The infusion module includes a reservoir, a piston, a screw, a driving unit, a driving wheel provided with wheel teeth, at least one linear actuator and at least one reset unit. The driving unit includes at least one rotating shaft and at least one driving member. The driving member includes a driving end. The driving member rotates around the rotating shaft. The linear actuator and the reset unit respectively connect to the driving member. The program module is connected to the detection module and the infusion module respectively, imported the total daily dose algorithm and the current insulin infusion algorithm. The
(Continued)

driving power can be controlled, and it can accurately calculate the TDD value and the current insulin infusion dose.

12 Claims, 5 Drawing Sheets

(51) Int. Cl.
*A61M 5/145* (2006.01)
*A61M 5/168* (2006.01)
*A61M 5/315* (2006.01)
*G16H 20/17* (2018.01)
*G16H 40/67* (2018.01)
*A61M 5/172* (2006.01)

(52) U.S. Cl.
CPC ...... *A61M 5/14248* (2013.01); *A61M 5/1452* (2013.01); *A61M 5/1454* (2013.01); *A61M 5/16877* (2013.01); *A61M 5/31583* (2013.01); *G16H 20/17* (2018.01); *G16H 40/67* (2018.01); *A61M 2005/14208* (2013.01); *A61M 2005/14252* (2013.01); *A61M 2005/14506* (2013.01); *A61M 5/1723* (2013.01); *A61M 2205/0233* (2013.01); *A61M 2205/3317* (2013.01); *A61M 2205/3327* (2013.01); *A61M 2230/201* (2013.01)

(56) References Cited

U.S. PATENT DOCUMENTS

| | | | |
|---|---|---|---|
| 11,081,226 B2* | 8/2021 | Booth | G16H 40/63 |
| 2013/0211370 A1* | 8/2013 | Nzike | A61M 5/1452 604/152 |
| 2014/0107607 A1 | 4/2014 | Estes | |
| 2014/0180240 A1 | 6/2014 | Finan et al. | |
| 2015/0025498 A1 | 1/2015 | Estes | |
| 2019/0009019 A1 | 1/2019 | Shor et al. | |
| 2019/0117881 A1 | 4/2019 | Yang | |
| 2021/0100951 A1* | 4/2021 | Chase | A61M 5/1723 |
| 2021/0193285 A1* | 6/2021 | Nimri | G16H 40/40 |

FOREIGN PATENT DOCUMENTS

| | | |
|---|---|---|
| CN | 108472440 | 8/2018 |
| CN | 209378210 | 9/2019 |
| WO | 2011064780 | 6/2011 |
| WO | 2011091246 | 7/2011 |

OTHER PUBLICATIONS

"International Search Report (Form PCT/ISA/210) of PCT/CN2020/111171", mailed on Dec. 4, 2020, pp. 1-3.

* cited by examiner

UNILATERALLY DRIVEN CLOSED-LOOP ARTIFICIAL PANCREAS AND DATA OBTAINING METHOD FOR PROGRAM MODULE THEREOF

CROSS-REFERENCE TO RELATED APPLICATION

This application is a 371 of international application of PCT application serial no. PCT/CN2020/111171, filed on Aug. 26, 2020, which claims the priority benefit of PCT application no. PCT/CN2019/130445, filed on Dec. 31, 2019. The entirety of each of the above-mentioned patent applications is hereby incorporated by reference herein and made a part of this specification.

TECHNICAL FIELD

The present invention mainly relates to the field of medical instruments, in particular to a unilaterally driven closed-loop artificial pancreas.

BACKGROUND

The pancreas in a normal person can automatically monitor the amount of glucose in the blood and automatically secrete the required dosage of insulin/glucagon. However, for diabetic patients, the function of the pancreas is abnormal, and the pancreas cannot normally secrete required dosage of insulin. Therefore, diabetes is a metabolic disease caused by abnormal pancreatic function and also a lifelong disease. At present, medical technology cannot cure diabetes, but can only control the onset and development of diabetes and its complications by stabilizing blood glucose.

Patients with diabetes need to check their blood glucose before injecting insulin into the body. At present, most of the detection methods can continuously detect blood glucose, and send the blood glucose data to the remote device in real time for the user to view. This detection method is called Continuous Glucose Monitoring (CGM), which requires the detection device to be attached to the surface of the patients' skin, and the sensor carried by the device is inserted into the subcutaneous tissue fluid for testing. According to the blood glucose (BG) level, the infusion device, as a closed-loop or semi-closed-loop artificial pancreas, injects the currently required insulin dose.

At present, the detection device and the infusion device are connected to each other to form a closed-loop artificial pancreas with the processing of the program module. While the program module is calculating the insulin infusion dose, total daily dose (TDD) is an important parameter with many determinants, such as physical conditions, physiological conditions, etc.

However, the closed-loop artificial pancreas in prior art needs to be manually input the physical conditions instead of automatically detecting, and the TDD value cannot be accurately obtained, resulting in inaccurate current insulin infusion dose and worsening user experience. And the driving power is insufficient, resulting in insulin blockage.

Therefore, in the prior art, there is an urgent need for a closed-loop artificial pancreas that can avoid insulin blockage and accurately calculate the current infusion dose.

BRIEF SUMMARY OF THE INVENTION

The embodiment of the invention discloses a unilaterally driven closed-loop artificial pancreas, in which the driving power can be controlled, and it can accurately calculate the TDD value and the current insulin infusion dose, enhancing user experience.

The invention discloses a unilaterally driven closed-loop artificial pancreas, comprising: a detection module configured to detect blood glucose; an infusion module, including: a reservoir, a piston and a screw, the piston, connected with the screw, is arranged in the reservoir; a driving unit, the driving unit includes at least one rotating shaft, at least one driving member, the driving member includes a driving end, the driving member rotates around the rotating shaft to advance the driving end; at least one driving wheel provided with wheel teeth, the advancing driving end pushes the wheel teeth to rotate the driving wheel, thereby driving the screw forward; at least one linear actuator and at least one reset unit respectively connected to the driving member, the linear actuator provides the driving member with power to advance the driving end, the reset unit applies a force to the driving member to make the driving end rotate in the reset direction; and a program module, which is connected to the detention module and the infusion module respectively, is imported the total daily dose algorithm and the current insulin infusion algorithm, and the force output of the linear actuator or the reset unit when the program module is controlled by the program module according to the calculation result of the current insulin infusion algorithm, thereby controlling the infusion module to infuse insulin required.

According to one aspect of the invention, the linear actuator includes an electrically driven linear actuator or an electrically heated linear actuator.

According to one aspect of the present invention, the reset unit includes an electrically driven linear actuator, an electrically heated linear actuator, or an elastic member.

According to one aspect of the present invention, the elastic member includes a spring or conductive rubber.

According to one aspect of the present invention, the program module includes a manual input interface or an automatic detection sub-module, and the method for the program module to obtain the insulin dose infused per day by users includes: the insulin dose infused per day by users is manually input into the program module through the manual input interface; or the insulin dose infused per day by users is automatically detected, stored and calculated by the automatic detection sub-module.

According to one aspect of the present invention, the insulin dose infused per day by users includes the total amount of daily infusion dose data, or the bolus and basal data infused in different time periods, or the temporary basal data and the correction bolus data, or the infusion data after different events.

According to one aspect of the present invention, the total daily dose is obtained by calculating the total amount of daily infusion dose data in the previous two or more days according to the total daily dose algorithm, and the total daily dose is the average or median of the insulin dose infused per day by users, and the total daily dose is one variable factor of the current insulin infusion algorithm.

According to one aspect of the present invention, the variable factors of the total daily dose algorithm include one or more of the user's physical activity status, physiological status, psychological status, and meal status.

According to one aspect of the present invention, the physical activity status includes general body stretching, exercise, or sleep.

According to one aspect of the present invention, it further comprises a motion sensor, which is provided in the detection module, the program module or the infusion module, is used to automatically sense the user's physical activity status which can be sent to the program module and is one of the variable factors of the total daily dose algorithm or the current insulin infusion algorithm.

According to one aspect of the present invention, the motion sensor includes a three-axis acceleration sensor or a gyroscope.

According to one aspect of the present invention, any two of the detection module, the program module and the infusion module are connected to each other configured to form a single structure whose attached position on the shin is different from the third module.

According to one aspect of the present invention, the detection module, the program module and the infusion module are connected together configured to form a single structure which is attached on only one position on the skin.

Compared with the prior art, the technical solution of the present invention has the following advantages:

In the unilaterally driven closed-loop artificial pancreas disclosed in the present invention, the program module, which is connected with the detention module and the infusion module respectively, is imported the total daily dose algorithm and the current insulin infusion algorithm, and the force output of the linear actuator or the reset unit the program module is controlled by the program module according to the calculation result of the current insulin infusion algorithm, thereby controlling the infusion module to infuse insulin required. The program module is imported into the total daily dose algorithm and the current insulin infusion algorithm. Using the detection data, the insulin dose infused per day by users and the total daily dose alone or in combination makes the current insulin infusion dose more accurate. Secondly, the driving unit includes at least one rotating shaft, at least one driving member, the driving member includes a driving end, the driving member rotates around the rotating shaft to advance the driving end; at least one driving wheel provided with wheel teeth, the advancing driving end pushes the wheel teeth to rotate the driving wheel, thereby driving the screw forward; the infusion module further includes at least one linear actuator and at least one reset unit respectively connected to the driving member. The linear actuator can provide a sufficiently great and stable driving power, which in turn enables the drug infusion module to have a sufficiently great and stable and controllable infusion pressure to avoid insulin blockage and eliminate potential safety hazards.

Furthermore, the program module includes a manual input interface or an automatic detection sub-module, and the method for the program module to obtain the insulin dose infused per day by users includes: the insulin dose infused per day by users is manually input into the program module through the manual input interface; or the insulin dose infused per day by users is automatically detected, stored and calculated by the automatic detection sub-module. The manual input interface or the automatic detection sub-module can be used alone or a combined, which enhances the flexibility using the device. Secondly, with the manual input interface and the automatic detection sub-module used in combination, the data automatically detected and manually input can be combined and compared to make the program module adjust the algorithm in real time, helping to make the calculation result more accurate.

Furthermore, the physical activity status includes general body stretching, exercise or sleep. The artificial pancreas can distinguish normal activities, exercise and sleep, making the artificial pancreas more refined to control blood glucose level.

Furthermore, the motion sensor is provided in the detection module, the program module or the infusion module. The motion sensor provided in the artificial pancreas, not disposed in other structure, can improve the integration of the artificial pancreas as much as possible, reduce the size of the device, and enhance the user experience.

Furthermore, the motion sensor includes a three-axis acceleration sensor or a gyroscope. The three-axis acceleration sensor or gyroscope can sense the body's activity intensity, activity mode or body posture accurately, ultimately improving the accuracy of the calculation result of the infusion dose.

Furthermore, the detection module, the program module and the infusion module are connected together configured to form a single structure which is attached on only one position on the skin. If the three modules are connected as a whole and attached in the only one position, the number of the device on the user skin will be reduced, thereby reducing the interference of more attached devices on user activities. At the same time, it also effectively solves the problem of the poor wireless communication between separating devices, further enhancing the user experience.

DETAILED DESCRIPTION

As mentioned above, the infusion module of the prior art is prone to blockage, thereby having potential safety hazards. And it cannot accurately obtain the total daily dose.

It has been found through research that the cause of the above problem is that the driving power is insufficient, and total daily dose algorithm is not perfect.

In order to solve this problem, the present invention discloses a unilaterally driven closed-loop artificial pancreas, in which the driving power can be controlled, and it can accurately calculate the TDD value and the current insulin infusion dose, enhancing user experience.

Various exemplary embodiments of the present invention will now be described in detail with reference to the drawings. The relative arrangement of the components and the steps, numerical expressions and numerical values set forth in the embodiments are not to be construed as limiting the scope of the invention.

In addition, it should be understood that, for ease of description, the dimensions of the various components shown in the figures are not necessarily drawn in the actual scale relationship, for example, the thickness, width, length or distance of certain units may be exaggerated relative to other structures.

The following description of the exemplary embodiments is merely illustrative, and is not intended to be in any way limiting the invention and its application or use. The techniques, methods and devices that are known to those of ordinary skill in the art may not be discussed in detail, but such techniques, methods and devices should be considered as part of the specification.

It should be noted that similar reference numerals and letters indicate similar items in the following figures. Therefore, once an item is defined or illustrated in a drawing, it will not be discussed further in following description of the drawings.

Figure 1:
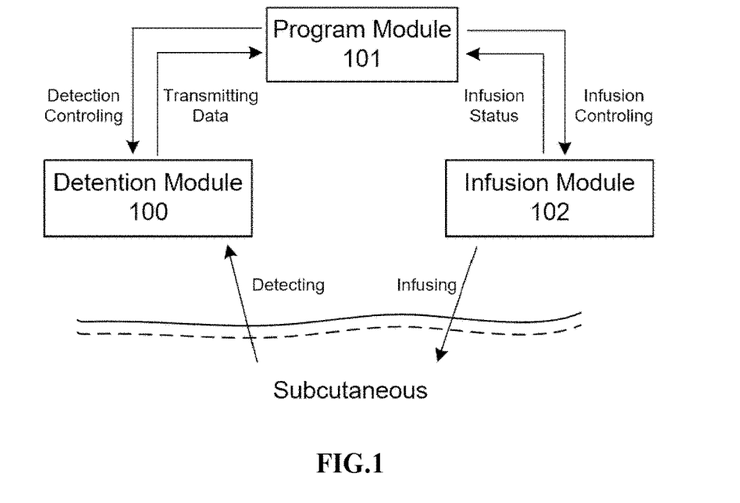
FIG. 1 is a schematic diagram of the module relationship of the unilaterally driven closed-loop artificial pancreas according to one embodiment of the present invention.

FIG. 1 is a schematic diagram of the module relationship of the closed-loop artificial pancreas according to the embodiment of the present invention.

The closed-loop artificial pancreas disclosed in the embodiment of the present invention mainly includes a detection module 100, a program module 101, and an infusion module 102.

The detection module 100 is used to continuously detect the user's real-time blood glucose (BG) level. Generally, the detection module 100 is a Continuous Glucose Monitoring (CGM) for detecting real-time BG, monitoring BG changes, and also sending them to the program module 101.

The program module 101 is used to control the detection module 100 and the infusion module 102. Therefore, the program module 101 is connected to the detection module 100 and the infusion module 102, respectively. Here, the connection refers to a conventional electrical connection or a wireless connection.

The infusion module 102 includes the essential mechanical structures used to infuse insulin and controlled by the program module 101, which will be described in detail below. According to the current insulin infusion dose calculated by the program module 101, the infusion module 102 injects the currently insulin dose required into the user's body. At the same time, the real-time infusion status of the infusion module 102 can also be fed back to the program module 101.

The embodiment of the present invention does not limit the specific positions and connection relationships of the detection module 100, the program module 101 and the infusion module 102, as long as the aforementioned functional conditions can be satisfied.

As in an embodiment of the present invention, the three are electrically connected to form a single structure. Therefore, the three modules can be attached together on only one position of the user's skin. If the three modules are connected as a whole and attached in the only one position, the number of the device on the user skin will be reduced, thereby reducing the interference of more attached devices on user activities. At the same time, it also effectively solves the problem of the poor wireless communication between separating devices, further enhancing the user experience.

As in another embodiment of the present invention, the program module 101 and the infusion module 102 are electrically connected to each other to form a single structure while the detection module 100 is separately provided in another structure. At this time, the detection module 100 and the program module 101 transmit wireless signals to each other to realize mutual connection. Therefore, the program module 101 and the infusion module 102 can be attached on the same position of the user's skin while the detection module 100 is attached on the other position.

As in another embodiment of the present invention, the program module 101 and the detection module 100 are electrically connected to each other forming a single structure while the infusion module 102 is separately provided in another structure. The infusion module 102 and the program module 101 transmit wireless signals to each other to realize mutual connection. Therefore, the program module 101 and the detection module 100 can be attached on the same position of the user's skin while the infusion module 102 is attached on the other position.

As in another embodiment of the present invention, the three are respectively provided in different structures, thus being attached on different position. At this time, the program module 101, the detection module 100 and the infusion module 102 respectively transmit wireless signals to each other to realize mutual connection.

It should be noted that the program module 101 of the embodiment of the present invention also has functions such as storage, recording, and access to the database, thus, the program module 101 can be reused. In this way, not only can the user's physical condition data be stored, but also the production cost and the user's consumption cost can be saved. As described above, when the service life of the detection module 100 or the infusion module 102 expires, the program module 101 can be separated from the detection module 100, the infusion module 102, or both the detection module 100 and the infusion module 102.

Generally, the service lives of the detection module 100, the program module 101 and the infusion module 102 are different. Therefore, when the three are electrically connected to each other to form a single device, the three can also be separated from each other in pairs. For example, if one module expires firstly, the user can only replace this module and keep the other two modules continuous using.

Here, it should be noted that the program module 101 of the embodiment of the present invention may also include multiple sub-modules. According to the functions of the sub-modules, different sub-modules can be respectively assembled in different structure, which is not specific limitation herein, as long as the control conditions of the program module 101 can be satisfied.

In the embodiment of the present invention, the program module 101 is also used to obtain data including the insulin dose infused per day by users. Generally, for artificial pancreas, the current insulin dose required is closely related to the insulin dose infused per day by users in history. Preferably, in the embodiment of the present invention, the insulin dose infused per day by users includes the total amount of daily infusion dose data (d), or the bolus and basal data infused in different time periods, or the temporary basal data and the correction bolus data, or the infusion data after different events.

The program module 101 includes a manual input interface (not shown) or an automatic detection sub-module (not shown). By using the manual input interface or the automatic detection sub-module alone, or using the two combination, the program module 101 can obtain the user's physical condition data. This alone or combination using of these two modules enhances the flexibility in using the device.

For example, in an embodiment of the present invention, with the manual input interface, users can manually input the insulin dose infused per day by users into the program module 101 according to the clinical guidance. In another embodiment of the present invention, the program module 101 has already stored and recorded the user's previous insulin infusion data. With the automatic detection sub-module, the program module 101 can automatically obtain and calculate the insulin dose infused per day by users. Preferably, in the embodiment of the present invention, the user uses the manual input interface in combination with the automatic detection sub-module. At this time, the data automatically detected and the manually input can be combined and compared, making the program module 101 adjust the algorithm in real time for obtaining more accurate calculation outcome.

In other embodiments of the present invention, through the manual input interface, users can also input other information, such as meal information, exercise information, sleep information, and physical condition information into the program module 101, which is not specifically limited herein.

Generally, the purpose of using an artificial pancreas is to stabilize the BG level, that is, an appropriate dose of insulin needs to be infused into the user's body. However, the current insulin infusion dose is closely related to the total daily dose (TDD) which is an important factor influencing the current insulin infusion dose. Therefore, the program module 101 is imported into the total daily dose algorithm and the current insulin infusion algorithm, which are used to calculate the TDD and the current insulin infusion dose, respectively.

The current insulin infusion algorithm is used to calculate the current insulin infusion dose required. In the embodiment of the present invention, there are also many factors affecting the current insulin infusion dose, such as physical activity status, TDD, etc. Preferably, in the embodiment of the present invention, the TDD is one of the variable factors. Therefore, the more accurate the TDD or the more accurate the artificial pancreas sensing the user's activity status, the more accurate the current insulin infusion dose will be. And TDD can be obtained from calculating the aforementioned insulin dose infused per day by users according to the total daily dose algorithm. At the same time, the program module 101 can alone or in combination uses the detection data, the insulin dose infused per day by users and TDD data to calculate the current insulin infusion dose.

There are many factors that affect TDD, and some of them are related to the user's physical condition. Therefore, in the embodiment of the present invention, the variable factors of the total daily dose algorithm include one or more of the user's physical activity status, physiological status, psychological status, and meal status.

Here, the physiological status of the user includes one or more factors of weight, gender, age, disease condition, and menstrual period.

The user's psychological status includes emotional conditions such as anger, fear, depression, hyperactivity, and excitement.

The user's physical activity status includes general body stretching, exercise, or sleep. The artificial pancreas can distinguish normal activities, exercise and sleep, making the artificial pancreas more refined to control BG levels.

As mentioned above, TDD is obtained by the program module 101 by calculating the total amount of daily infusion dose data (d) in the previous two days or more according to the total daily dose algorithm. Preferably, in the embodiment of the present invention, TDD is obtained by the program module 101 by calculating the total amount of daily infusion dose data (d) in the previous seven days. Preferably, TDD is the average value of the total amount of daily infusion dose data (d).

In an embodiment of the present invention, if $d_7$, $d_6$, . . . , $d_2$, $d_1$ respectively represent the total amount of daily infusion dose data in the previous seventh day, the previous sixth day, . . . , the day before yesterday, and yesterday, then:

$$TDD=(d_7+d_6+ \ldots +d_2+d_1)/7$$

that is, TDD is the arithmetic average of the total amount of daily infusion dose data (d).

If the time is much closer to the today, the total amount of daily infusion dose data (d) is much closer to the actual TDD. Therefore, in another embodiment of the present invention, different $d_n$ has different weights $\gamma_n$, such as the corresponding weights $\gamma_7$, $\gamma_6$, . . . , $\gamma_2$, $\gamma_1$, then:

$$TDD=\gamma_7 d_7+\gamma_6 d_6+ \ldots +\gamma_2 d_2+\gamma_1 d_1$$

that is, TDD is the weighted average of the total amount of insulin infused per day (d).

It should be noted that the embodiment of the present invention does not limit the statistical method of $d_n$. In yet another embodiment of the present invention, the TDD value can be determined by the median of the total amount of daily infusion dose data (d) in the previous seven days. In another embodiment of the present invention, the maximum value and minimum value of $d_n$ may be eliminated firstly, and then the averaging process is performed. Another embodiment of the present invention introduces variance or standard deviation method with discarding points with larger errors firstly and then performing averaging processing. In other embodiments of the present invention, a method of combining weighted average with a sliding data frame may also be used to make the calculation result of TDD more accurate.

Here, it should be noted that the sliding data frame refers to select the data, like from previous five consecutive days, as a data frame for statistics. And according to the passage of time, the data frame as a whole moves backward for several days, but still keeps including data of another previous five consecutive days. For the specific statistical method of the data in the sliding data frame, please refer to the foresaid, which will not be repeated herein.

As mentioned above, both TDD and the current insulin infusion dose are affected by physical activities. Therefore, the closed-loop artificial pancreas also includes a motion sensor (not shown) which is used to sense the user's physical activity. And the program module 101 can receive physical activity status information. The motion sensor can automatically and accurately sense the physical activity status of the user which will be sent to the program module 101, making the calculation result of the TDD or the current insulin infusion dose much more accurate, and enhancing the user experience. At the same time, providing the motion sensor in the module of the artificial pancreas can improve the integration of the artificial pancreas as much as possible, reduce the device size, and enhance the user experience.

The motion sensor is provided in the detection module 100, the program module 101 or the infusion module 102. Preferably, in the embodiment of the present invention, the motion sensor is provided in the program module 101.

It should be noted that the embodiment of the present invention does not limit the number of motion sensors and the installation positions of these multiple motion sensors, as long as the conditions for the motion sensor to sense the user's activity status can be satisfied.

The motion sensor includes a three-axis acceleration sensor or a gyroscope. The three-axis acceleration sensor or gyroscope can more accurately sense the body's activity intensity, activity mode or body posture, which ultimately makes the calculation result of the infusion more accurate. Preferably, in the embodiment of the present invention, the motion sensor is the combination of a three-axis acceleration sensor and a gyroscope.

Figure 2A:
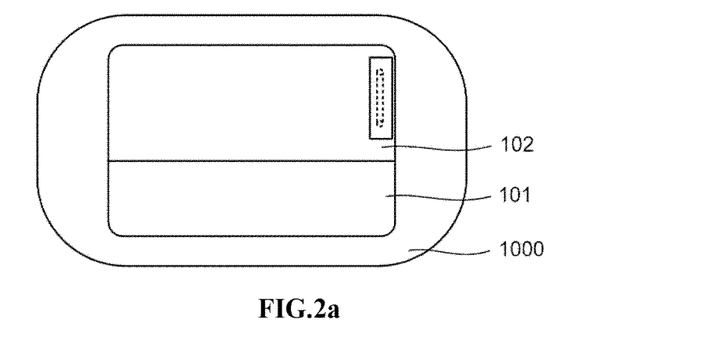
FIG. 2a-FIG. 2b are schematic top views of a structure formed by the combination of the program module and the infusion module according to two different embodiments of the present invention.
Figure 2B:
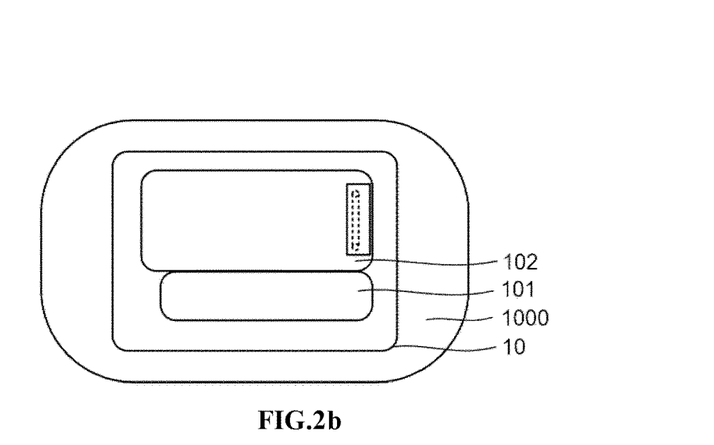

FIG. 2a and FIG. 2b are schematic top views of a structure formed by the combination of the program module 101 and the infusion module 102 according to two different embodiments of the present invention.

The program module 101 is used to control the force output of the linear actuator or the reset unit, thereby controlling the infusion module to infuse insulin required.

In the embodiment of the present invention, the program module 101 and the infusion module 102 are designed separately and connected by a waterproof plug. In another embodiment of the present invention, the infusion module 102 and the program module 101 are disposed inside the same housing 10 and connected by a wire, which both units will be discarded together after a single use, as shown in FIG. 2b.

The adhesive patch 1000 is used to attach the infusion module 102 or the program module 101, or both of them as a whole to the host skin surface.

Figure 3:
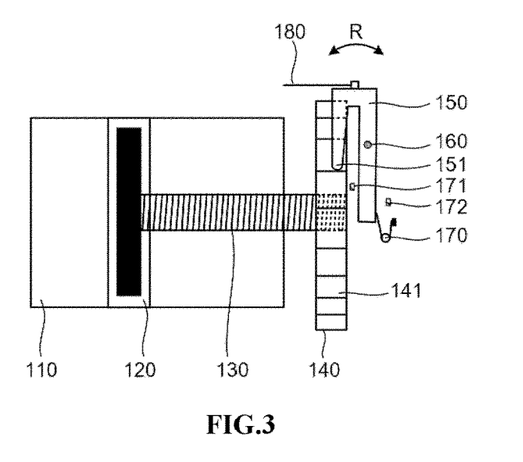
FIG. 3 is a schematic diagram of the main structure of an infusion module according to one embodiment of the present invention.

FIG. 3 is a schematic diagram of an infusion module 102 according to an embodiment of the present invention.

The internal structure of the infusion module 102 mainly includes the reservoir 110, the piston 120, the screw 130, the driving wheel 140, the driving unit (not shown), the reset unit 170 and the linear actuator 180. The driving unit includes at least one driving member 150 and at least one rotating shaft 160. In the embodiment of this present invention, the driving member 150 is connected to the reset unit 170 and the linear actuator 180, respectively. It should be noted that the connection herein includes mechanical connection or electrical connection.

The reservoir 110 is used for storing insulin.

The piston 120 is used to infuse insulin into the body.

The screw 130 is connected to the piston 120 and the driving wheel 140, respectively. In the embodiment of the present invention, the driving wheel 140 advances the screw 130 forward by screwing, the screw 130 then forces the piston 120, arranged in the reservoir 110, to move forward, so as to achieve the purpose of insulin infusion.

The peripheral surface of the driving wheel 140 is provided with wheel teeth 141. The wheel teeth 141 are gear teeth or ratchet teeth. Specifically, in the embodiment of the present invention, for improving driving efficiency, the wheel teeth 141 are ratchet teeth which can be pushed more easily.

One driving end 151 is provided on the driving member 150 to push the wheel teeth 141 and thereby rotate the driving wheel 140. The driving member 150 is movably connected to the rotating shaft 160.

The linear actuator 180 and the reset unit 170 cooperate with each other to make the driving member 150 rotate reciprocally around the rotating shaft 160, as shown in the R direction in FIG. 3, thereby making the driving end 151 move in the advancing direction and reset direction. When the driving member 150 performs one reciprocating rotation, the driving wheel 140 drives the screw 130 forward one step, and the screw 130 engages the piston 120 to infuse one unit of insulin.

It should be noted here that the advancing direction of the driving end 151 refers to the direction in which the wheel teeth 141 moves, while the reset direction of the driving end 151 is opposite to the advancing direction. While moving in the reset direction, the driving end 151 only slides on the surface of the wheel teeth 141 without pushing.

In some embodiments of the present invention, the reset unit 170 includes a spring, an elastic piece, an elastic plate, an elastic rod, rubber and other elastic members. It should be noted that the spring herein includes a compression spring, an extension spring, or a torsion spring, etc, the meaning of which applies to the spring below. In some embodiments of the present invention, the reset unit 170 may also be an elastic conductive member, such as a metal spring, conductive rubber, or the like. In other embodiments of the present invention, the reset unit 170 is an electrically driven linear actuator or an electrically heated linear actuator, such as a shape memory alloy, which will be described in detail below. The type, material selection or the position of the reset unit 170 are not specifically limited herein, as long as it can satisfy the condition of making the driving member 150 rotate in the reset direction.

After being energized, the physical form of the material of the linear actuator 180 changes, which makes shrinkage deformation of the linear actuator 180 occur, thereby outputting the driving power to rotate the driving member 150. The higher the current is, the larger the shrinkage deformation of the linear actuator 180 occurs, and the greater the driving power outputs. Obviously, when the current is constant, the driving power output by the linear actuator 180 is also constant, because of which the linear actuator 180 can output stable and controllable infusion driving power.

Preferably, the linear actuator 180 is an electrically driven linear actuator or an electrically heated linear actuator. By alternately turning on and off, the linear actuator 180 outputs power in pulses. Specifically, in the embodiment of the present invention, the linear actuator 180 is a shape memory alloy.

Figure 4A:
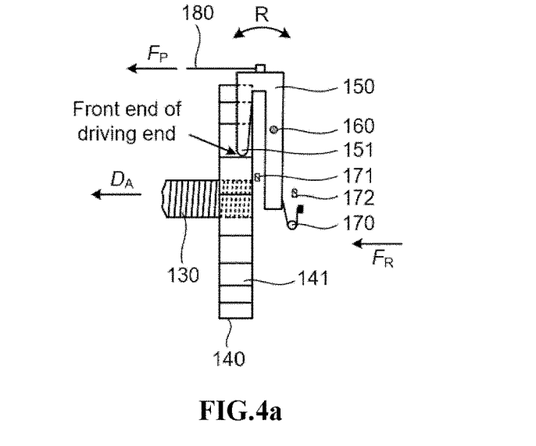
FIG. 4a-FIG. 4c are schematic diagrams in which the pulling direction of the linear actuator is parallel to the forward direction of the screw according to different embodiments of the present invention.
Figure 4B:
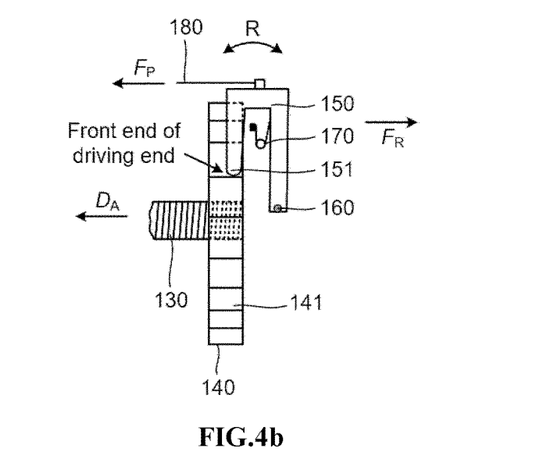
Figure 4C:
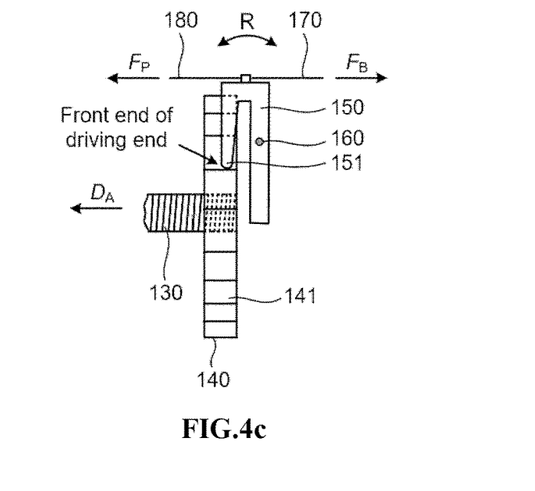
Figure 5A:
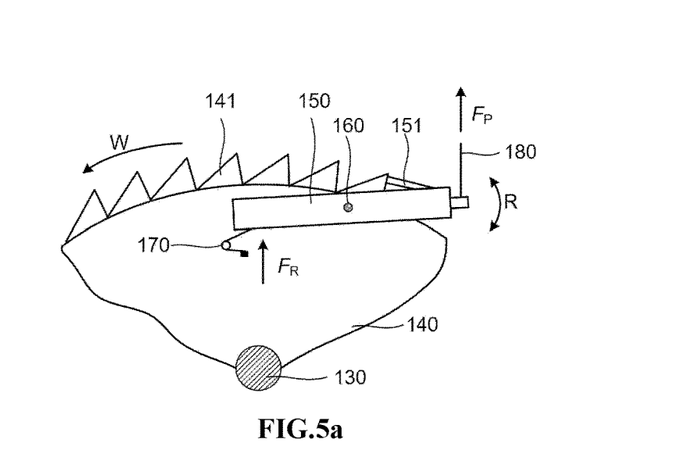
FIG. 5a-FIG. 5b are schematic diagrams in which the pulling direction of the linear actuator is perpendicular to the forward direction of the screw according to another embodiment of the present invention.
Figure 5B:
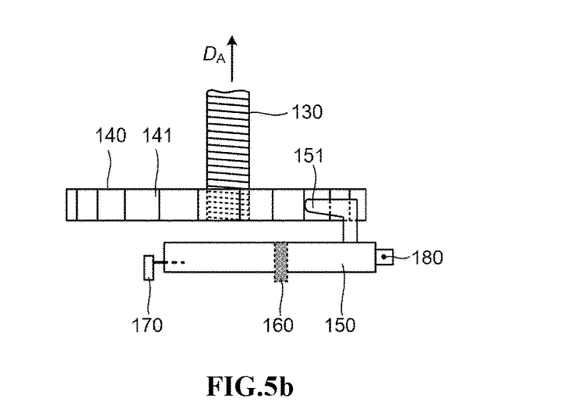

FIG. 4a-FIG. 5b are schematic diagrams of the driving end 151 pushing the wheel teeth 141 in different embodiments of the present invention. FIG. 5b is a top view of FIG. 5a.

As shown in FIG. 4a, in the embodiment of the present invention, when the linear actuator 180 pulls the driving member 150 by force $F_P$, the driving member 150 rotates counter-clockwise (advancing direction) around the rotating shaft 160, driving the driving end 151 to push the wheel teeth 141 forward, and thereby making the driving wheel 140 rotate. The driving wheel 140 then moves the screw 130 forward in the $D_A$ direction. At this time, the reset unit 170 is an elastic member which builds a gradually increasing elastic force $F_R$. When the linear actuator 180 stops applying force and under the action of only the elastic force $F_R$, the driving member 150 will rotate clockwise (reset direction) around the rotating shaft 160. At this time, the driving end 151 stops pushing the wheel teeth 141, but just slides on the surface of the adjacent wheel teeth 141 until it slides to the next driving position, and the driving wheel 140 stops rotating. The driving member 150 completes one reciprocating rotation.

In one embodiment of the present invention, in order to minimize the impact of manufacturing tolerances and ensure that the wheel teeth 141 can be pushed during each reciprocating rotation for infusion safety, after the driving end 151 slides to the next driving position, the driving member 150 can be further rotated clockwise by an appropriate distance to move the front end of the driving end 151 slightly away from the driving position.

As shown in FIG. 4b, in another embodiment of the present invention, the reset unit 170 and the linear actuator 180 are on the same side of the rotating shaft 160. And according to the general technical principles, those skilled in the art can adjust the positional relationship and the connection relationship of the reset unit 170, the driving member 150, and the linear actuator 180, which is not specifically limited herein, as long as the above-mentioned rotation processes can be achieved.

As shown in FIG. 4c, in yet another embodiment of the present invention, the reset unit 170 is an electrically driven linear actuator or an electrically heated linear actuator, such as a shape memory alloy. Although the technical principle that the driving end 151 pushes the wheel teeth 141 is consistent with the foregoing, the driving member 150 cannot automatically reset after the driving end 151 stops advancing, therefore, the reset unit 170 is required to provide the reset force $F_B$. The directions of $F_P$ and $F_B$ are opposite, thereby making the driving member 150 rotate reciprocally with the cooperation of the reset unit 170 and the linear actuator 180. Obviously, those skilled in the art can adjust the directions of the $F_P$ and $F_B$ as needed, as long as the conditions for reciprocating rotation of the driving member 150 are satisfied. And when the linear actuator is also used by the reset unit 170, the rotation amplitude of the driving member 150 is flexible and controllable with the cooperation of both the linear actuator 180 and the reset unit 170, which makes the infusion module have a variety of different infusion modes, such as different infusion increment or different infusion rate, etc.

Preferably, as shown in FIG. 4a to FIG. 4c, in the embodiment of the present invention, the direction of $F_P$, $P_R$ (or $F_B$) and $D_A$ are parallel to one another. This parallel design can make full use of space and optimize the structural relationships inside the infusion module, making the internal structure more compact.

In other embodiments of the present invention, the $F_P$ direction and the $F_R$ (or $F_B$) direction may not be parallel, which is not specifically limited herein, as long as the purpose of making the driving member 150 rotate reciprocally can be achieved.

As shown in FIG. 5a and FIG. 5b, the direction of the linear actuator 180 pulling force $F_P$ is perpendicular to the forward direction $D_A$ of the screw 130. The rotating shaft 160 and the reset unit 170 are provided on the base (not shown). As described above, the driving member 150 rotating reciprocally in the R direction drives the driving end 151 to push the wheel teeth 141, causing the driving wheel 140 to rotate in the W direction and driving the screw 130 to advance in the $D_A$ direction. The driving principle of the driving member 150 is consistent with the foregoing embodiment.

In the embodiment of the present invention, blocking wall 171 and 172 (as shown in FIG. 3 and FIG. 4a), which can stop the driving member 150 from rotating, are also provided in the infusion module 102. And an electrical signal may be triggered when the driving member 150 contacts the blocking wall 171 or 172, allowing the program module 101 to control the power output of the linear actuator 180. In another embodiment of the present invention, only the blocking wall 171 or only the blocking wall 172 may be provided, so that the rotating terminal in either direction of the driving member 150 is controlled by the program module 101.

It should be noted that, the position of the blocking wall 171 or 172 is not specifically limited in the embodiment of the present invention, as long as the condition that the driving member 150 stops rotating can be satisfied.

In another embodiment of the present invention, no blocking wall is provided (as shown in FIG. 4b to FIG. 5b), and the rotating terminal of the driving member 150 is completely controlled by the program module 101.

Figure 6A:
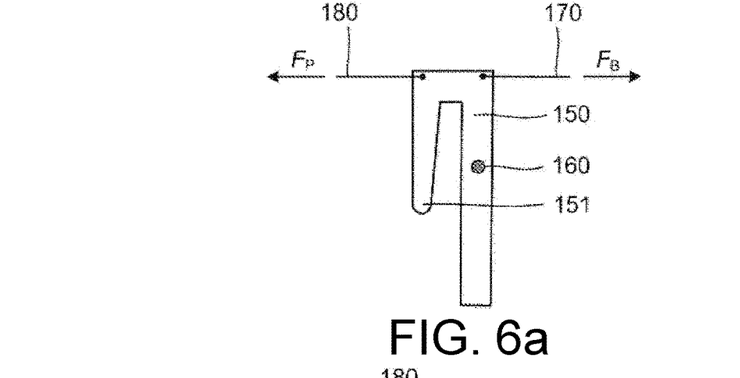
FIG. 6a-FIG. 6b are schematic diagrams of the linear actuator and the reset unit outputting the force on different positions of the driving unit according to different embodiments of the present invention.
Figure 6B:
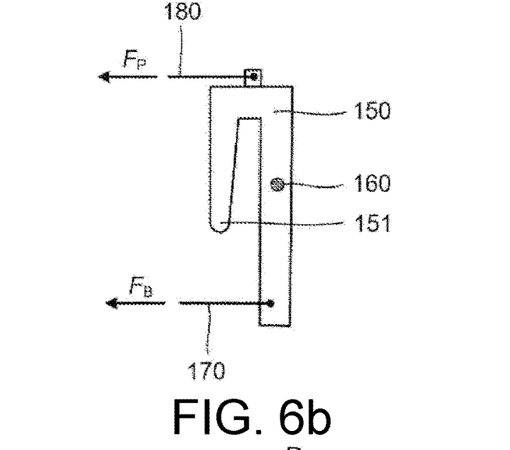

FIG. 6a-FIG. 6b are schematic diagrams of the linear actuator 180 and the reset unit 170 outputting the force on different positions of the driving unit 150 according to different embodiments.

The embodiment of the present invention does not limit the position and direction of the reset force $F_B$ and the power $F_P$, as shown in FIG. 6a and FIG. 6b.

Figure 7:
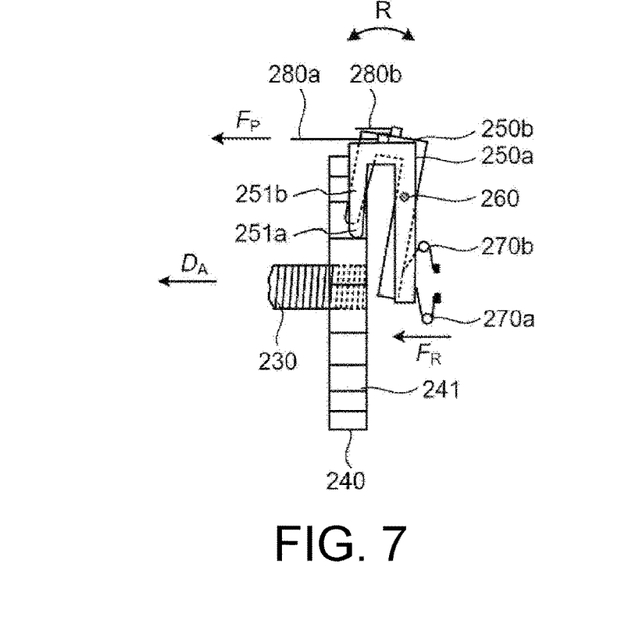
FIG. 7-FIG. 8 are schematic diagrams of a driving unit of a unilaterally driven closed-loop artificial pancreas including two driving members according to different embodiments of the present invention.
Figure 8:
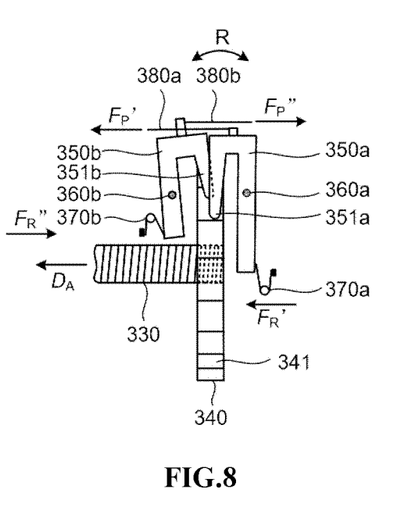

FIG. 7 and FIG. 8 are schematic diagrams of a driving unit of a unilaterally driven closed-loop artificial pancreas including two driving members according to different embodiments of the present invention.

As shown in FIG. 7, the driving member 250a rotates reciprocally in the R direction around the rotating shaft 260 under the action of the linear actuator 280a and the reset unit 270a. Similarly, the driving member 250b rotates reciprocally in the R direction around the rotating shaft 260 under the action of the linear actuator 280b and the reset unit 270b. In the embodiment of the present invention, the reciprocating rotations of the two driving members do not interfere with each other.

Preferably, in the embodiment of the present invention, the driving member 250a and the driving member 250b rotate asynchronously. That is, when the driving end 251a of the driving member 250a pushes the wheel teeth 241 to move, the driving end 251b of the driving member 250b slides on the surface of the wheel teeth 241. When the driving end 251b slides to the driving position of the next wheel teeth 241, the program module controls the linear actuator 280a to stop outputting power to the driving member 250a, and in turn controls the linear actuator 280b to output power to the driving member 250b. At this time, the driving member 250a rotates in the clockwise direction under the action of the reset unit 270a, and the driving end 251a slides on the surface of the wheel teeth, while the driving end 251b pushes the wheel teeth 241. The driving members 250a and 250b are alternately powered to push the driving wheels 240.

In the embodiment of the present invention, the pulling force $F_P$ of the linear actuators 280a and 280b, the elastic force $F_R$ of the reset units 270a and 270b and the forward direction $D_A$ of the screw 230 are shown in the figure. Like foregoing, the direction of the pulling force $F_P$ is parallel to the forward direction $D_A$ of the screw 230.

In the embodiment of the present invention, the types of the reset units 270a and 270b and the rotation method of the driving members 250a and 250b can be referred to the above, which will not be repeated herein.

As shown in FIG. 8, the driving ends 351a and 351b alternately push the wheel teeth 341, respectively, and the power output of the linear actuators 380a and 380b are both controlled by the program module 101.

It should be noted that, in the embodiment of the present invention, the direction of the pulling force $F_P'$ of the linear actuator 380a and the direction of the pulling force $F_P''$ of the linear actuator 380b are opposite. Obviously, the direction of the returning force $F_R'$ of the reset unit 370a and the direction of the returning force $F_R''$ of the reset unit 370b are also opposite.

Also, in the embodiment of the present invention, the driving members 350a and 350b rotate asynchronously. That is, when the driving end 351a of the driving member 350a pushes the wheel teeth 341 to forward, the driving end 351b of the driving member 350b slides on the surface of the wheel teeth 341. When the driving end 351b slides to the driving position of the next wheel teeth 341, the program module controls the linear actuator 380a to stop outputting power to the driving member 350a, and in turn controls the linear actuator 380b to output power to the driving member 350b. The driving member 350a returns to the clockwise rotation by the reset unit 370a, while the driving end 351a slides on the surface of the wheel teeth 341, and the driving end 351b pushes the wheel teeth 341. The driving members 350a and 350b alternately pushes the driving wheels 340. Obviously, the direction of driving rotating or return rotating is opposite between the driving members 350a and 350b.

Similarly, the types of the reset units 370a and 370b and the rotation method of the driving members 350a and 350b can be referred to the above, which will not be repeated herein.

It should be noted that, in other embodiments of the present invention, more driving members can be arranged in the driving unit, or more driving wheels can also be provided in the infusion module, therefore, different driving members respectively push the corresponding driving wheels to rotate. As in one embodiment of the present invention, the infusion module is provided with one driving member and two driving wheels. The driving member drives only one driving wheel, while the other driving wheel is used to balance the effect of force. In this case, the distance between the two driving wheels can be relatively short.

In the embodiment of the present invention, when two or more driving members are provided, by controlling the timing of different force output or by adjusting the distance between the front ends (as shown in FIG. 3) of multiple driving ends, the infusion module can improve the infusion accuracy. As shown in FIG. 7 and FIG. 8, when the driving members are both at the end of the return rotating, the distance between the front ends of the two driving ends may differ by n/2 (n is an odd number) tooth pitch. At this time, when the driving wheel rotates at most ½ tooth pitch, one driving member will reach the next driving position leading to the next rotating. Compared to a single driving member, the infusion increment (or the infusion module amount) is halved, thereby doubling the infusion accuracy. Therefore, the drug infusion module has a variety of different infusion modes, such as different infusion increment or different infusion rate, which is convenient for the user to choose according to the actual infusion requirements. In the embodiment of the present invention, n=1, 3, or 5. In order to avoid possible interference between the two adjacent driving ends, it is preferable that n=3. Only rotating at most half a pitch at one time, the driving wheel can start the next rotation. The driving member's rotation amplitude is further reduced, and the internal structure of the infusion module will be more compact and smaller.

In summary, the present invention discloses a unilaterally driven closed-loop artificial pancreas, in which the driving power can be controlled, and it can accurately calculate the TDD value and the current insulin infusion dose, enhancing user experience.

While the invention has been described in detail with reference to the specific embodiments of the present invention, it should be understood that it will be appreciated by those skilled in the art that the above embodiments may be modified without departing from the scope and spirit of the invention. The scope of the invention is defined by the appended claims.

The invention claimed is:

1. A unilaterally driven closed-loop artificial pancreas, comprising:
    a detection module configured to continuously detect a real-time blood glucose level;
    an infusion module, comprising:
        a reservoir, a piston and a screw, wherein the piston, connected with the screw, is arranged in the reservoir;
        a driving unit, wherein the driving unit comprises at least one rotating shaft, at least one driving member, the driving member includes a driving end, and the driving member rotates around the rotating shaft to advance the driving end;
        at least one driving wheel provided with wheel teeth, wherein the driving end which is advancing pushes the wheel teeth to rotate the driving wheel, thereby driving the screw forward;
        at least one linear actuator and at least one reset unit which are connected to the driving member, wherein the linear actuator provides the driving member with power to advance the driving end, the reset unit applies a force to the driving member to make the driving end rotate in a reset direction; and
    a program module, which is connected to the detention module and the infusion module, is imported a total daily dose algorithm and a current insulin infusion algorithm, and a force output of the linear actuator or the reset unit is controlled by the program module according to a calculation result of the current insulin infusion algorithm, thereby controlling the infusion module to infuse insulin required,
    wherein the linear actuator comprises an electrically driven linear actuator or an electrically heated linear actuator.

2. The unilaterally driven closed-loop artificial pancreas of claim 1, wherein
    the reset unit includes an electrically driven linear actuator, an electrically heated linear actuator, or an elastic member.

3. The unilaterally driven closed-loop artificial pancreas of claim 2, wherein
    the elastic member includes a spring or conductive rubber.

4. The data obtaining method for program module of unilaterally driven closed-loop artificial pancreas, comprising:
    providing a unilaterally driven closed-loop artificial pancreas of claim 1, wherein the program module includes a manual input interface or an automatic detection sub-module, and the method for the program module to obtain the insulin dose infused per day by users comprises: the insulin dose infused per day by users is manually input into the program module through the manual input interface; or the insulin dose infused per day by users is automatically detected, stored and calculated by the automatic detection sub-module.

5. The data obtaining method for program module of unilaterally driven closed-loop artificial pancreas of claim 4, wherein
    the insulin dose infused per day by users includes a total amount of daily infusion dose data, or a bolus and basal data infused in different time periods, or a temporary basal data and a correction bolus data, or an infusion data after different events.

6. The data obtaining method for program module of unilaterally driven closed-loop artificial pancreas of claim 5, wherein the total daily dose is obtained by calculating the total amount of daily infusion dose data in previous two or more days according to the total daily dose algorithm, and the total daily dose is an average or a median of the insulin dose infused per day by users, and the total daily dose is one variable factor of the current insulin infusion algorithm.

7. The data obtaining method for program module of unilaterally driven closed-loop artificial pancreas of claim 4, wherein variable factors of the total daily dose algorithm comprise one or more of user's physical activity status, physiological status, psychological status, and meal status.

8. The data obtaining method for program module of unilaterally driven closed-loop artificial pancreas of claim 7, wherein the physical activity status comprises general body stretching, exercise, or sleep.

9. The unilaterally driven closed-loop artificial pancreas of claim 1, further comprising a motion sensor, wherein the motion sensor which is provided in the detection module, the program module or the infusion module, is used to automatically sense user's physical activity status which is sent to the program module and is one of variable factors of the total daily dose algorithm or the current insulin infusion algorithm.

10. The unilaterally driven closed-loop artificial pancreas of claim 9, wherein the motion sensor comprises a three-axis acceleration sensor or a gyroscope.

11. The unilaterally driven closed-loop artificial pancreas of claim 1, wherein any two of the detection modules, the program module and the infusion module are connected to each other configured to form a single structure whose attached position on a skin is different from a rest one of the detection module, the program module and the infusion module.

12. The unilaterally driven closed-loop artificial pancreas of claim 1, wherein the detection module, the program module and the infusion module are connected together configured to form a single structure which is attached on only one position on the skin.

* * * * *